United States Patent
Puppi et al.

(10) Patent No.: US 11,685,198 B2
(45) Date of Patent: Jun. 27, 2023

(54) PROCESS FOR PRODUCING TYRES CAPABLE OF REDUCING CAVITY NOISE AND SET OF TYRES OBTAINED THEREBY

(71) Applicant: Pirelli Tyre S.p.A., Milan (IT)

(72) Inventors: Cristiano Puppi, Milan (IT); Gianni Mancini, Turin (IT); Stefano Sangiovanni, Milan (IT)

(73) Assignee: PIRELLI TYRE S.p.A., Milan (IT)

(*) Notice: Subject to any disclaimer, the term of this patent is extended or adjusted under 35 U.S.C. 154(b) by 430 days.

(21) Appl. No.: 16/630,701

(22) PCT Filed: Jun. 28, 2018

(86) PCT No.: PCT/IT2018/050119
§ 371 (c)(1),
(2) Date: Jan. 13, 2020

(87) PCT Pub. No.: WO2019/021328
PCT Pub. Date: Jan. 31, 2019

(65) Prior Publication Data
US 2021/0086567 A1    Mar. 25, 2021

(30) Foreign Application Priority Data
Jul. 27, 2017 (IT) .................... 102017000086503

(51) Int. Cl.
*B60C 19/00* (2006.01)
*B29D 30/00* (2006.01)

(52) U.S. Cl.
CPC ........ *B60C 19/002* (2013.01); *B29D 30/0016* (2013.01); *B29D 30/0061* (2013.01)

(58) Field of Classification Search
CPC ....... B60C 19/00; B60C 19/002; B60C 19/12; B60C 19/125; B29D 30/0016; B29D 30/0061

(Continued)

(56) References Cited

U.S. PATENT DOCUMENTS 6,343,843 B1    2/2002  Nishikawa
7,874,329 B2    1/2011  Tanno
(Continued)

FOREIGN PATENT DOCUMENTS

DE    11 2014 005 324 T5    8/2016
EP          1510366 B1       5/2008
(Continued)

OTHER PUBLICATIONS

Kim Hyeong Seok, KR-1473850-B1, machine translation. (Year: 2014).*

(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

The process for producing tyres comprises arranging no more than four sets of noise-reducing elements, each set being associated with a respective dimension $L_x$ different from each other; feeding in succession a set of tyres for vehicle wheels, having different values C of the inner circumferential extension; for each inner circumferential extension value, determining a respective number $n_x$ of noise-reducing elements for each set of noise-reducing elements, with x ranging from 1 to N, wherein for at least one value of the inner circumferential extension at least two respective numbers $n_x$ differ from 0; for each tyre, collecting from each set of noise-reducing elements the respective number $n_x$ of noise-reducing elements and applying the collected noise-reducing elements in circumferential sequence along an inner surface of the tyre, with dimension $L_x$ oriented circumferentially.

23 Claims, 12 Drawing Sheets

(58) Field of Classification Search
USPC .................................. 156/110.1; 152/450
See application file for complete search history.

(56) References Cited

U.S. PATENT DOCUMENTS

| | | |
|---|---|---|
| 2009/0277551 A1 | 11/2009 | Yukawa |
| 2012/0037294 A1 | 2/2012 | Yukawa |
| 2012/0175032 A1 | 7/2012 | Yukawa |
| 2016/0288587 A1 | 10/2016 | Tanno |
| 2016/0297260 A1* | 10/2016 | Tanno ................ B29D 30/0061 |
| 2017/0151839 A1 | 6/2017 | Chiodini et al. |
| 2017/0225417 A1 | 8/2017 | Puppi et al. |

FOREIGN PATENT DOCUMENTS

| | | | |
|---|---|---|---|
| EP | 2017092 A1 | 1/2009 | |
| EP | 2067633 B1 | 3/2012 | |
| EP | 2123491 B1 | 2/2013 | |
| EP | 3173258 A1 | 5/2017 | |
| KR | 20090018418 A | 2/2009 | |
| KR | 1473850 B1 * | 12/2014 | ............... B60C 1/00 |
| WO | WO 02/085648 A1 | 10/2002 | |
| WO | WO 2016/067192 A1 | 5/2016 | |

OTHER PUBLICATIONS

International Search Report form the European Patent Office in corresponding International Application No. PCT/IT2018/050119 dated Sep. 28, 2018.

Written Opinion of the International Searching Authority from the European Patent Office in corresponding International Application No. PCT/IT2018/050119 dated Sep. 28, 2018.

Notice of Reasons for Rejection dated Mar. 30, 2022, from Japanese Patent Office, in counterpart Japanese Application No. 2020-501127.

* cited by examiner

PROCESS FOR PRODUCING TYRES CAPABLE OF REDUCING CAVITY NOISE AND SET OF TYRES OBTAINED THEREBY

This application is a national stage entry application under 35 U.S.C. § 371 based on International Application No. PCT/162018/050119, filed Jun. 28, 2018, and claims priority to Italian Patent Application No. 102017000086503, filed Jul. 27, 2017; the content of each application is incorporated herein by reference.

TECHNICAL FIELD OF THE INVENTION

The present invention relates to the field of the processes for the production of tyres for vehicle wheels.

In particular, the present invention relates to a process for producing tyres capable of reducing cavity noise, and a relative set of tyres.

STATE OF THE ART

Typically, a tyre has a substantially toroidal structure about an axis of rotation thereof during operation, and it has an axial middle plane which is perpendicular to the axis of rotation, said plane being typically a plane of (substantial) geometric symmetry (e.g. neglecting any minor asymmetries, such as the tread pattern and/or the lettering on the sides and/or the internal structure).

By "inner cavity" it is meant the space delimited by the inner surface of the tyre and by the surface of the mounting rim which faces the inner surface of the tyre, when mounted.

By "inner circumferential extension" it is meant the linear extension of the inner surface of the tyre on its axial middle plane.

The terms "radial" and "axial" and the expressions "radially internal/external" and "axially internal/external" are used respectively referring to a direction perpendicular to and a direction parallel to the axis of rotation of the tyre.

The terms "circumferential" and "circumferentially" are instead used with reference to the direction of the annular extension of the tyre, i.e. the rolling direction of the tyre.

With the expression "noise-reducing element" it is meant an element which, once applied to the inner surface of a tyre (typically to the portion of inner surface placed at the tread band), has the capability to attenuate the noise produced because of the presence of the inner cavity during the rolling (cavity noise). This capability is usually given to the aforesaid element by the type of material, or materials, with which said element is made and/or by the dimensions thereof and/or by the number of elements placed in the cavity. Such noise-reducing elements may consist of blocks, for example of substantially parallelepiped shape, of porous material, for example expanded polymeric material, which are glued to the inner portion of surface of the tyre which is located at the tread band and arranged sequentially one after the other along the inner circumferential extension of the tyre itself. In the following description, a tyre comprising cavity noise-reducing elements will be referred to as a "soundproof tyre".

Document EP1510366 discloses an assembly of tyre, rim and a noise-reducing body having a volume ranging from 0.4% to 20% of the total volume of the inner cavity. In one embodiment, the noise-reducing body comprises a plurality of equidistant blocks.

Document U.S. Pat. No. 7,874,329 discloses a soundproof tyre in which a plurality of noise-reducing elements made of porous material is attached to the inner surface of the tyre. The total length obtained by integrating the lengths of the noise-reducing elements is not less than 75% of the inner circumferential extension of the tyre. The distance between each pair of adjacent noise-reducing elements is equal to or greater than the maximum thickness of the noise-reducing elements at their end portions, although not greater than 15% of the inner circumferential extension of the tyre.

Document EP2067633 discloses a noise reducing device and a tyre, in which the tyre vibrations and the noise can be reduced. The noise reduction device comprises two main noise-reducing elements adapted to change the sectional area of a tyre cavity and two auxiliary noise-reducing elements disposed between the two main noise-reducing elements. In the embodiment described in EP2067633, all the main noise-reducing elements and all the auxiliary noise-reducing elements have length substantially equal to ¼ of the inner circumferential extension of the tyre.

Document EP2123491 discloses a noise reduction device comprising at least one noise-reducing element made of porous material attached to the inner surface of the tyre tread portion. The noise-reducing element may include a plurality of parts arranged spaced along a circumferential direction of the tyre.

Document WO2016/067192 discloses a process and an apparatus for automatically applying a noise-reducing element to a tyre for vehicle wheels.

SUMMARY OF THE INVENTION

In the context of tyres having a sequence of noise-reducing elements applied to the inner surface of the tyre in order to reduce cavity noise, the Applicant has felt the opportunity to guarantee high quality and high performance of the tyres, and at the same time a high productivity of the processes and lines dedicated to the production of this type of tyres.

The Applicant has observed that the plants for the industrial production of tyres typically produce tyres of different models and sizes, even simultaneously or in a temporally close sequence. The operation of applying the sequence of noise-reducing elements takes place on the tyre after the moulding and vulcanization step. The Applicant has observed that the tyres fed to the stations for applying the noise-reducing elements typically arrive randomly as regards models and sizes, and consequently as regards the inner circumferential extension on which the noise-reducing elements are to be applied.

The Applicant has observed that this fact determines some problems.

For example, the Applicant has noted that it is possible to manage the variability of the inner circumferential extensions of the tyres fed to the stations for applying the noise-reducing elements, associating, to each value of circumferential extension, a specific sequence of noise-reducing elements, all of them equal to each other and having circumferential length optimized for that value of circumferential extension, in such a number to obtain the desired coverage of circumferential extension. In this way it is necessary to use a large number (in principle comparable with the number of different circumferential extensions, e.g. tens) of different noise-reducing elements, characterized by different circumferential lengths.

This results in a complex and/or expensive management of the logistics necessary to supply and feed a large number of different noise-reducing elements, including purchase, storage, handling and feeding to the application apparatuses. Furthermore, the efficiency and/or the cost of the production process can be jeopardized by the machine downtime and/or by the consumption of resources needed to configure and set up the apparatuses dedicated to the management, handling and application of the various noise-reducing elements "dedicated" to each inner circumferential extension.

The Applicant has also noted that, to solve the aforesaid productivity problem, it is possible to manage the variability of inner circumferential extensions of the tyres fed to the stations for applying the noise-reducing elements using a single type of noise-reducing elements, all having the same circumferential length. However, in this case the Applicant has noted that for a production of tyres of different models and sizes it is not always possible to realize a sequence able to cover each inner circumferential extension as desired. For example, for one or more values of inner circumferential extension, the portion of such extension left free may be excessive, with degradation of the soundproofing capacity.

In principle this latter problem could be at least mitigated by using noise-reducing elements all having equal and sufficiently short circumferential length. However, in this case the overall number of noise-reducing elements constituting each sequence would be very high, in particular for the higher values of inner circumferential extension, with evident lengthening of the time for their application and a consequent lowering of the overall productivity and/or increase in costs.

In this context, the Applicant has therefore faced the problem of maintaining the desired performance of the produced soundproof tyres, including the acoustic performances, at the same time by a process of application of the noise-reducing elements with high productivity and/or with limited costs and/or complexity.

The Applicant has also posed the problem of obtaining a desired coverage of the inner circumferential extension of a production of tyres of different models and sizes by the noise-reducing elements, at the same time without needing to rely on noise-reducing elements "dedicated" to each inner circumferential extension, and/or to an excessive number of elements to be applied on a single tyre.

The Applicant has found that few (from four to only two) sets of noise-reducing elements homogeneous in length, from which to select a suitable sequence as a function of the value of inner circumferential extension, are sufficient to obtain the desired coverage of the inner circumferential extension even in the presence of a strong variability of the inner circumferential extension, without at the same time overcomplicating the management and application of noise-reducing elements (due to the reduced number of types of elements) and/or without excessively lengthening the time necessary for their application on each individual tyre.

According to an aspect, the present invention relates to a process for producing tyres, comprising:

arranging a plurality N of sets of noise-reducing elements, wherein all the noise-reducing elements belonging to each set have a respective substantially equal dimension $L_x$, with x ranging from 1 to N, wherein said respective dimension $L_x$ of the noise-reducing elements of each set differs from the respective dimension $L_x$ of the noise-reducing elements of the other N−1 sets, and wherein said plurality N of sets comprises no more than four sets;

feeding in succession a set of tyres for wheels of vehicles, each tyre having a respective inner circumferential extension, wherein the set of tyres has different values of the inner circumferential extension;

for each one of said inner circumferential extension values, determining a respective number $n_x$ of noise-reducing elements for each set of noise-reducing elements, with x ranging from 1 to N, as a function of said value of the inner circumferential extension, wherein for at least one value of the inner circumferential extension of said set of tyres, at least two respective numbers $n_x$ differ from 0;

for each tyre of said set of tyres, collecting from each set of noise-reducing elements the respective number $n_x$ of noise-reducing elements determined for the value of inner circumferential extension of said each tyre and applying said collected noise-reducing elements in a circumferential sequence along an inner surface of said each tyre, with said respective dimension $L_x$ oriented circumferentially.

According to another aspect, the present invention relates to a set of tyres for wheels of vehicles, wherein each tyre has a respective value of inner circumferential extension and wherein at least some tyres of the set of tyres have different values of the inner circumferential extension, wherein a respective sequence of noise-reducing elements is applied circumferentially along an inner surface of each tyre of said set of tyres, wherein the noise-reducing elements applied to said set of tyres belong to a plurality N of sets of noise-reducing elements, wherein all the noise-reducing elements belonging to each set of noise-reducing elements have a respective substantially equal circumferential dimension $L_x$, with x ranging from 1 to N, wherein the respective circumferential dimension $L_x$ of the noise-reducing elements of each set of noise-reducing elements differs from the respective circumferential dimension $L_x$ of the noise-reducing elements of the other N−1 sets of noise-reducing elements, and wherein said plurality N of sets comprises no more than four sets, wherein for each set of noise-reducing elements, said respective sequence of noise-reducing elements comprises a respective number $n_x$ of noise-reducing elements, with x ranging from 1 to N, the N-tuple of the respective numbers $n_x$ being a function of said respective value of the inner circumferential extension, and wherein for at least one sequence of noise-reducing elements, at least two respective numbers $n_x$ differ from zero.

With the term "substantially" referred to the dimensions $L_x$ of the noise-reducing elements, it is intended taking into account production tolerances (due, for example, to cutting operations) and/or manipulation (such as adaptation to the curved inner surface). Said operations of production and/or manipulation usually involve dimensional variations of the noise-reducing elements not higher than about 3% in excess or defect with respect to the nominal size. For example, for a circumferential dimension between about 150 mm and 250 mm, the tolerance can be about 1.5 mm.

The Applicant has found that the present invention allows to maintain at the desired level the overall performances of the tyres of a whole production of tyres which differs in models and/or sizes (in particular the performances in terms of noise reduction), while maintaining high the efficiency of the process of application of the noise-reducing elements and therefore of the entire tyre production process.

In fact, with a limited number (from two to four) of different sizes of the noise-reducing elements it is possible to realize, for each value of the inner circumferential extension and when this value varies, a suitable sequence of elements, selected among the available sizes, which adequately covers the inner circumferential extension for the purpose of cavity noise reduction.

The present invention allows, for example, while varying the inner circumferential extension, to realize sequences capable of accurately controlling the length of the overall portion of inner circumferential extension left free (hereinafter also referred to as "free arc") and/or to keep limited the total number of elements which constitute each single sequence.

The realized sequence typically comprises elements having different circumferential sizes (i.e. at least two, more typically all, the $n_x$ numbers are greater than zero), although in the present invention it is contemplated that for some values of the inner circumferential extension the sequence may consist of elements all having the same circumferential dimension (i.e. only one $n_x$ number is different from zero).

The present invention, in at least one of the aforesaid aspects, may have one or more of the preferred features which are described below.

Preferably, said plurality N of sets comprises no more than three sets (N=2 o N=3), even more preferably consists of two sets (N=2). In this way it is reduced the complexity of the management of the noise-reducing elements, including purchase, storage, picking and application. In particular, the Applicant has found that only two sets of noise-reducing elements are sufficient to adequately cover a large variety of circumferential extensions, thus having to manage only two different sizes or types of noise-reducing elements.

Preferably each of said respective $n_x$ numbers of noise-reducing elements is greater than or equal to zero and/or less than or equal to fifteen, more preferably less than or equal to twelve, even more preferably less than or equal to ten. Preferably each sequence contains an overall number of noise-reducing elements (sum of the $n_x$) not greater than fifteen, more preferably not greater than twelve. In this way, it is limited the total number of elements which are collected and applied to the tyre, with consequent limitation of the total cycle time necessary for their application.

Preferably, the respective numbers $n_x$ determined for each value of the inner circumferential extension of said set of tyres are determined also as a function of a free arc A, defined as the circumferential length of the overall portion of the inner circumferential extension left free of the noise-reducing elements of the applied sequence. In fact, the free arc is a parameter that can affect the acoustic performances of the tyre. For example, for excessive free arc values, the elements can perform an insufficient cavity noise reduction function. Preferably, the respective numbers $n_x$ determined for each value of the inner circumferential extension of said set of tyres are determined also as a function of a mean interval between the noise-reducing elements.

By "mean interval" it is meant the ratio between the free arc and the total number of noise-reducing elements of the applied sequence, that is a mean distance between the noise-reducing elements. In case the noise-reducing elements equally distributed along the inner circumferential extension, said mean interval substantially coincides with the actual circumferential distance between adjacent elements of the sequence.

The Applicant has observed that this mean interval is a parameter that can affect the acoustic performances of the tyre and/or the application process of the elements. For example, for excessive values of this mean interval, the elements can perform an insufficient cavity noise reduction action. For example, for too small values of this mean interval, the Applicant has realized that the adjacent elements can touch each other (also because of the manufacturing tolerances in the circumferential length of the elements and/or the variations of their circumferential length due to the deformations undergone in the adaptation to the inner curved surface) with possible problems of rubbing and/or wear and/or disconnect, or even with possible practical difficulties in applying the elements too close to each other. Therefore, the Applicant has realized that it is advantageous to accurately control this mean interval, for example within a desired minimum and/or maximum threshold value.

Preferably the respective numbers $n_x$, determined for each value of inner circumferential extension of said set of tyres, are determined using, or they satisfy, the formula:

$$\sum_{x=1}^{N} n_x * L_x + \Delta * \sum_{x=1}^{N} n_x = C$$

wherein $L_x$ is the respective dimension of the noise-reducing elements of the x-th set, C is said value of the inner circumferential extension and $\Delta$ is said mean interval. This formula allows, for example, to determine, for each inner circumferential extension C, the respective numbers $n_x$ to maintain the mean interval parameter within a predetermined interval. It is observed that the first addend of the left member represents the total length covered by the elements, while the second addend of the left member represents the free arc A.

Preferably it is provided:
calculating the free arc and/or the mean interval, more preferably using the aforesaid formula, for a plurality of N-tuples of numbers $n_x$, with each $n_x$ ranging from zero to a given maximum value (for example fifteen or twelve or ten);
selecting from among all the N-tuples of numbers $n_x$ considered, at least one N-tuple of numbers $n_x$ as a function of said calculated free arcs and/or of said calculated mean intervals.

In an embodiment said respective numbers $n_x$ are determined by selecting, among all the N-tuples of numbers $n_x$, with $n_x$ ranging from 0 to said given maximum value, an N-tuple of numbers corresponding to a minimum of said free arc. In this way, for each value of circumferential extension, it is identified the sequence that guarantees the maximum coverage of the inner circumferential extension, keeping limited the total number of elements.

Preferably it is provided selecting, among all the N-tuples of numbers $n_x$ to which corresponds a minimum of said free arc, an N-tuple of numbers having the minimum sum of the numbers $n_x$ (min $\Sigma_{x=1}^{N} n_x$). In fact, it can happen that the minimum value of the free arc occurs at two or more N-tuples of numbers. In this case it is advantageous selecting the N-tuple that has the least number of elements.

In an embodiment said respective numbers $n_x$ are determined by selecting, among all the N-tuples of numbers $n_x$, with each $n_x$ ranging from zero to said given maximum value, an N-tuple of numbers for which said mean interval is less than or equal to a given maximum threshold value. Preferably, said determined maximum threshold value of the mean interval is equal to 20 mm, more preferably it is equal to 15 mm, even more preferably it is equal to 10 mm. In this way, having predetermined an acceptable value of the mean interval, for example for the noise reduction, it is identified, for each circumferential value C, at least one sequence which guarantees this result.

In an embodiment said respective numbers $n_x$ are determined by selecting, among all the N-tuples of numbers $n_x$, with each $n_x$ ranging from zero to said given maximum value, an N-tuple of numbers for which said mean interval is greater than or equal to a given minimum threshold value differing from zero. Preferably said given minimum threshold value is equal to 3 mm, more preferably it is equal to 4 mm. The Applicant has in fact experimentally verified that in some cases it may be advantageous, rather than trying to minimize or even cancel the free arc, guaranteeing a minimum distance between adjacent elements, for example in order to accommodate the manufacturing tolerances of the elements and/or to avoid contact and/or mutual crushing between adjacent elements and/or to avoid technical difficulties arising from the application of elements too close to each other.

Preferably it is provided selecting, among all the N-tuples of numbers for which said mean interval is less than or equal to said given maximum threshold value and/or greater than or equal to said given minimum threshold value, an N-tuple of numbers having the minimum sum of the numbers $n_x$ (min $\Sigma_{x=1}^{N} n_x$). In fact, it typically happens that, given a minimum and/or maximum acceptable value for the mean interval, there exists a plurality of N-tuples which verify the condition on the mean interval. In this case it is advantageous to select the one that has the least number of elements.

Preferably, each noise-reducing element comprises or is made of a sound-proofing material, preferably a polymeric foam, preferably expanded polyurethane, preferably with open cells.

Preferably, the sound-proofing material has a density ranging from about 5 kg/m$^3$ to about 60 kg/m$^3$.

Preferably, each noise-reducing element is a parallelepiped (typically rectangle, although not necessarily) having said dimension $L_x$, a further dimension and a thickness.

Preferably, each noise-reducing element has in plan a rectangular shape having said dimension $L_x$ and said further dimension. For example, said dimension $L_x$ can correspond with the longer side of the rectangular shape. In use the thickness is arranged radially and the further dimension is arranged substantially in the axial direction (neglecting deformations of the elements). Preferably all the noise-reducing elements belonging to each set have a same three-dimensional shape and/or substantially the same dimensions and thickness, in order to simplify their handling.

Preferably all the noise-reducing elements of all the sets have the same further dimension and/or thickness (in other words the noise-reducing elements belonging to different sets differ only in the value of said dimension $L_x$). In this way each realized sequence of elements is substantially uniform along its entire development in relation to the transverse dimensions, thus avoiding problems of imbalance of the tyre during rolling and/or ensuring a homogeneous occupation of the cavity.

Preferably all the noise-reducing elements belonging to all the sets have a same three-dimensional shape, in order to simplify their manipulation.

Preferably, said respective dimension $L_x$ of all the noise-reducing elements is greater than or equal to 100 mm, more preferably greater than or equal to 150 mm, and/or less than or equal to 300 mm, more preferably less than or equal to 250 mm. Preferably, said further dimension of all the noise-reducing elements is greater than or equal to 80 mm and/or less than or equal to 160 mm, more preferably less than or equal to 140 mm. Preferably, the thickness of all the noise-reducing elements is greater than or equal to 10 mm and less than or equal to 50 mm. These noise-reducing elements have a good noise attenuation capacity; they can be easily attached to the inner surface of the tyre by gluing them with an adhesive; once glued, they do not deteriorate and do not detach when subjected to the deformation cycles of the tyre that rolls on the road; they also substantially maintain the other tyre performances substantially unchanged.

Preferably, sorting said sets of noise-reducing elements in ascending order of said respective dimension $L_x$, a difference between said respective dimension $L_x$ of the noise-reducing elements of each set and said respective dimension $L_x$ of the noise-reducing elements of a respective preceding and/or subsequent set is greater than or equal to 10 mm, more preferably greater than or equal to 20 mm, and/or less than or equal to 80 mm, more preferably less than or equal to 60 mm. The Applicant has verified that these values confer greater flexibility in covering a large number of different circumferential extensions. Preferably, in each tyre, the noise-reducing elements are applied sequentially at a tread band of the tyre.

Further features and advantages will be more apparent from the detailed description of preferred but not exclusive embodiments of the present invention.

BRIEF DESCRIPTION OF THE FIGURES

The description will be set out below with reference to the accompanying figures, provided for indicative purposes only and, therefore, not for limiting purposes, in which.

DETAILED DESCRIPTION OF SOME EMBODIMENTS OF THE INVENTION

Figure 1:
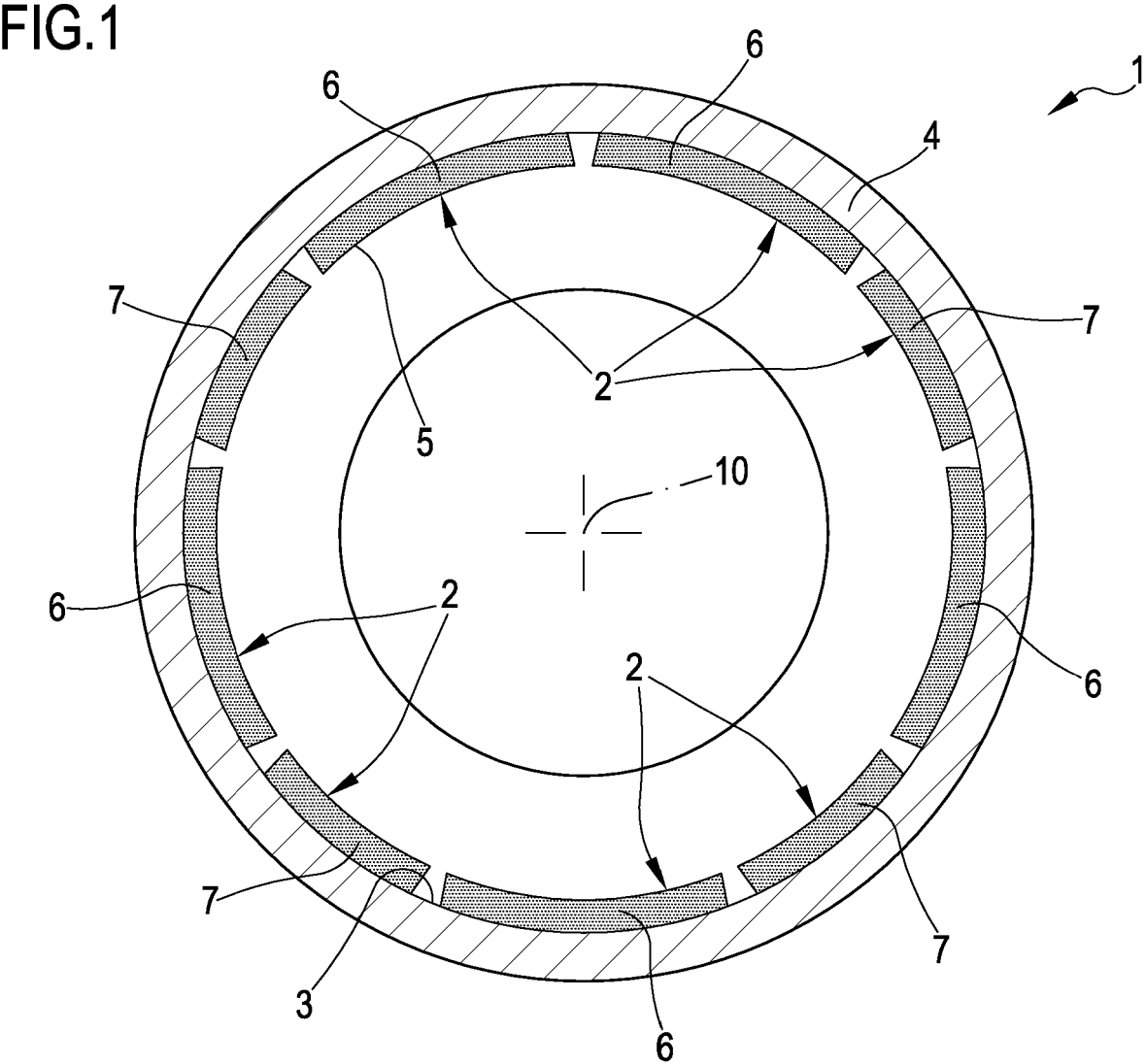
FIG. 1 shows in a purely schematic way and for descriptive purposes only, a section, not to scale, along the middle plane of a tyre produced with the process of the present invention.

With reference to FIG. 1, the tyre 1 has a rotation axis 10 and an inner circumferential extension of the internal surface 3 on the middle plane.

A sequence of noise-reducing elements 2 having two different dimensions (circumferential lengths) $L_1$, $L_2$ is applied circumferentially on the inner surface portion 3 of the tyre, preferably placed at the tread band 4.

Figure 1A:
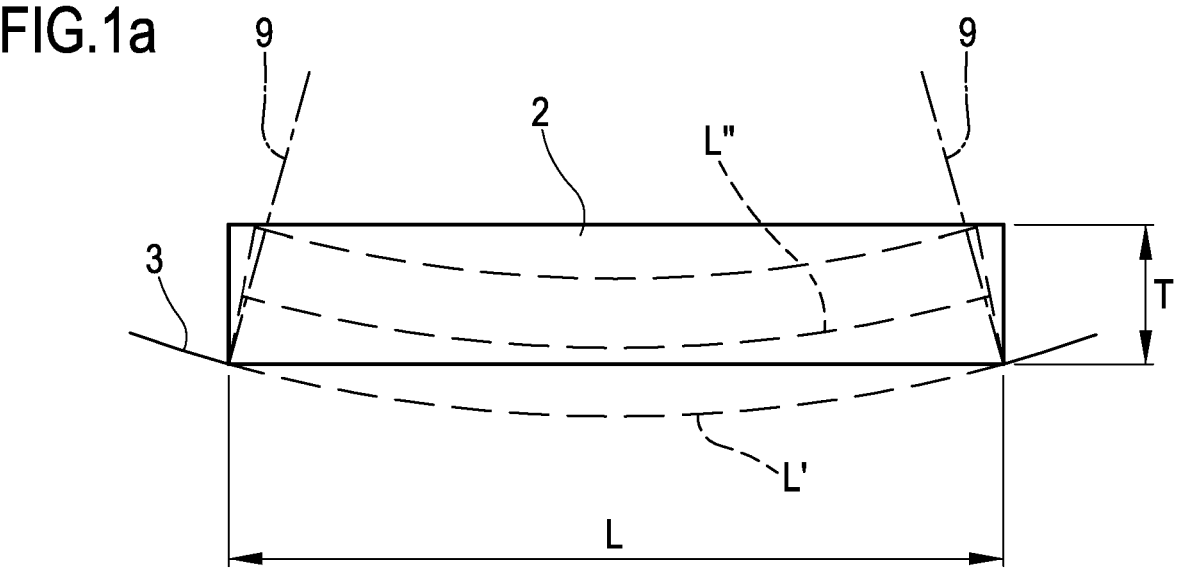
FIG. 1a shows a possible deformation profile of a noise-reducing element when applied to the inner surface of a tyre.

FIG. 1a shows a possible deformation profile of a noise-reducing element 2, which is exemplarily in the form of a straight parallelepiped in its undeformed configuration (although other shapes, such as prisms, non-straight parallelepipeds, etc. are contemplated).

Each noise-reducing element, when undeformed (continuous line), has a dimension L, a further dimension (perpendicular to the plane of FIG. 1a) and a thickness T.

When applied to the tyre (dashed line), the element 2 is subjected to a deformation to adapt its shape to the curved inner surface of the tyre. The nature and the extent of the deformation depends on one or more of some factors, such as the material and the shape of the undeformed element 2, the curvature profile of the tyre and the deformation modality of the element.

It is noted that due to the aforesaid deformation, it may happen that the distance between two adjacent elements varies along the direction of the thickness of the elements (i.e. along the radial direction). For example, the side faces of the elements 2 applied to the tyre can converge towards each other approaching the axis 10 (as shown in FIG. 1), so that the distance between two adjacent elements taken at the radially internal faces 5 is less than the respective distance taken on the liner 3.

In the present description, any reference to the sizes and thickness of an element 2 will be understood with respect to the undeformed element. This approach is particularly practical and simple. However, it is also possible, without departing from the present invention, to refer to the deformed element. For example, it is possible to take the aforesaid dimension of an element such as the circumferential length L' of its face in contact with the inner surface 3 of the tyre, or its circumferential length L" at any height along the thickness, for example at half-height (as shown in the figure) or on the radially inner face 5. Each of the lengths L, L', L" can be associated with the aforementioned dimension $L_x$.

Similarly, in the following it will be used the inner circumferential extension C as measured on the inner surface 3 (typically the inner surface of the liner) on the middle plane. However, it is possible, without departing from the present invention, to use other linear circumferential extensions depending on the aforesaid inner circumferential extensions C. For example, with reference to FIG. 1, it is possible to use the circumference of the rim which envelopes the radially internal surfaces 5 of the elements 2.

Figure 2:
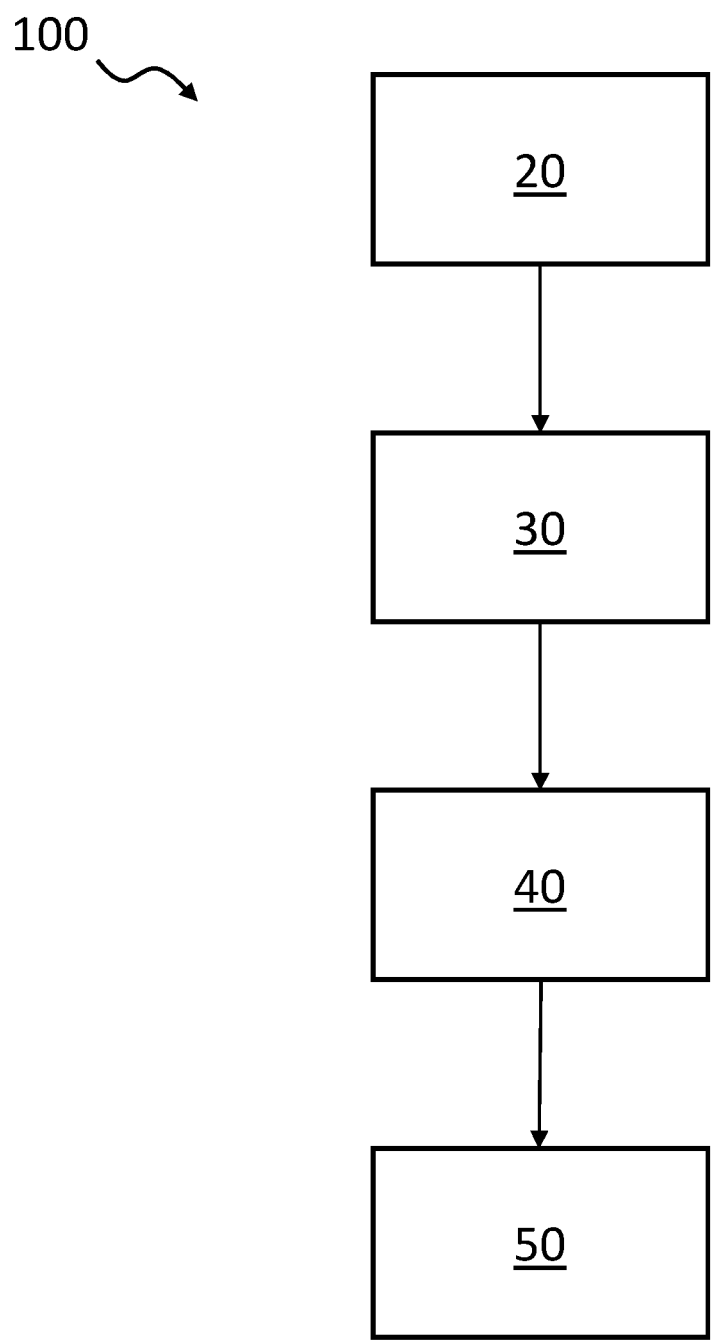
FIG. 2 schematically shows a flow chart of the process of the present invention.

FIG. 2 shows a flowchart of the process 100 for producing tyres 1 for wheels of vehicles according to the present invention.

It is provided the operation 20 of arranging a plurality N, wherein N is a number which goes from two to four, of sets of noise-reducing elements, wherein all the noise-reducing elements belonging to each set have substantially equal dimension $L_x$ (with x ranging from 1 to N), and wherein the dimension $L_x$ of the noise-reducing elements of each set differs from the dimension $L_x$ of the noise-reducing elements of the other sets.

It is provided the operation 30 of feeding in succession a set of tyres for wheels of vehicles, typically to a noise-reducing elements application station, each tyre having a respective inner circumferential extension C, wherein the set of tyres has different values of the inner circumferential extension, for example, the set includes tyres different in model and/or sizes.

Typically, said feeding occurs randomly as regards models and/or sizes of tyres fed, and consequently as regards the value of the inner circumferential extension. Typically, the number of different models and/or sizes can reach several tens in an industrial tyre production.

Preferably, for each tyre, the respective value of the inner circumferential extension C is determined, for example by identifying the size and/or the model of the tyre contained in a tyre identifier, such as a barcode or a QR code.

It is provided the operation 40 of determining, for each set of noise-reducing elements, a respective number $n_x$ of noise-reducing elements, with x ranging from 1 to N, as a function of said value of the inner circumferential extension C. This determination is made for each of the values of the inner circumferential extension of the different tyres to which the noise-reducing elements have to be applied. For at least one of said inner circumferential extension values, at least two respective numbers $n_x$ are different from zero. Typically, operation 40 is performed off-line. In particular, the N-tuples of numbers $n_x$ can be predetermined for each inner circumferential extension value and loaded into the treatment recipe of the tyres arriving at the noise-reducing elements application station. Once the inner circumferential extension of the tyre arriving at the station has been identified, the relative N-tuple of numbers $n_x$ is selected.

It is provided the operation 50 of, for each tyre of said set of tyres, collecting from each set of noise-reducing elements the respective number $n_x$ of noise-reducing elements and applying the collected noise-reducing elements in a circumferential sequence along the inner surface of said each tyre, with the dimension $L_x$ oriented circumferentially. The order of application along the sequence can be any. Preferably the noise-reducing elements are applied circumferentially equidistant from each other. In an embodiment the noise-reducing elements of different sizes are intercalated in the most possible homogeneous way (for example as shown in FIG. 1).

In the tyre exemplarily shown in FIG. 1, the sequence of noise-reducing elements consists of eleven elements belonging to two sets homogeneous in circumferential dimension (i.e. N=2), where five noise reducing elements 6 have dimension L1 greater than the dimension L2 of the remaining four noise reducing elements 7.

In the following, there will be described some exemplifying embodiments, with different values of N and $L_x$ and with different N-tuples selection methods for a set of tyres of different models and/or sizes, having different values of inner circumferential extension, according to what described above.

For all the examples and embodiments, the thickness of the elements is equal to 30 mm.

In all the graphs shown in the figures, the horizontal axis represents the inner circumferential extension C in mm and the considered values of inner circumferential extension C range from 1760 to 2600 mm.

First Embodiment

N=2
$L_1$=220 mm
$L_2$=176 mm

For each value of the inner circumferential extension C, for all the pairs of numbers $n_1$ and $n_2$, for example with $n_1$ and $n_2$ each going from zero to fifteen, the relative free arc A is calculated using the aforesaid formula:

$$\sum_{x=1}^{N} n_x * L_x + \Delta * \sum_{x=1}^{N} n_x = C$$

and the minimum value of free arc A is identified, namely the minimum of the term $A = \Delta * \sum_{x=1}^{N} n_x$.

In the case where the minimum value corresponds to several pairs of numbers $n_1$ and $n_2$, it is selected the pair having the minimum of the sum $n_1+n_2$ of the two numbers.

Figure 3A:
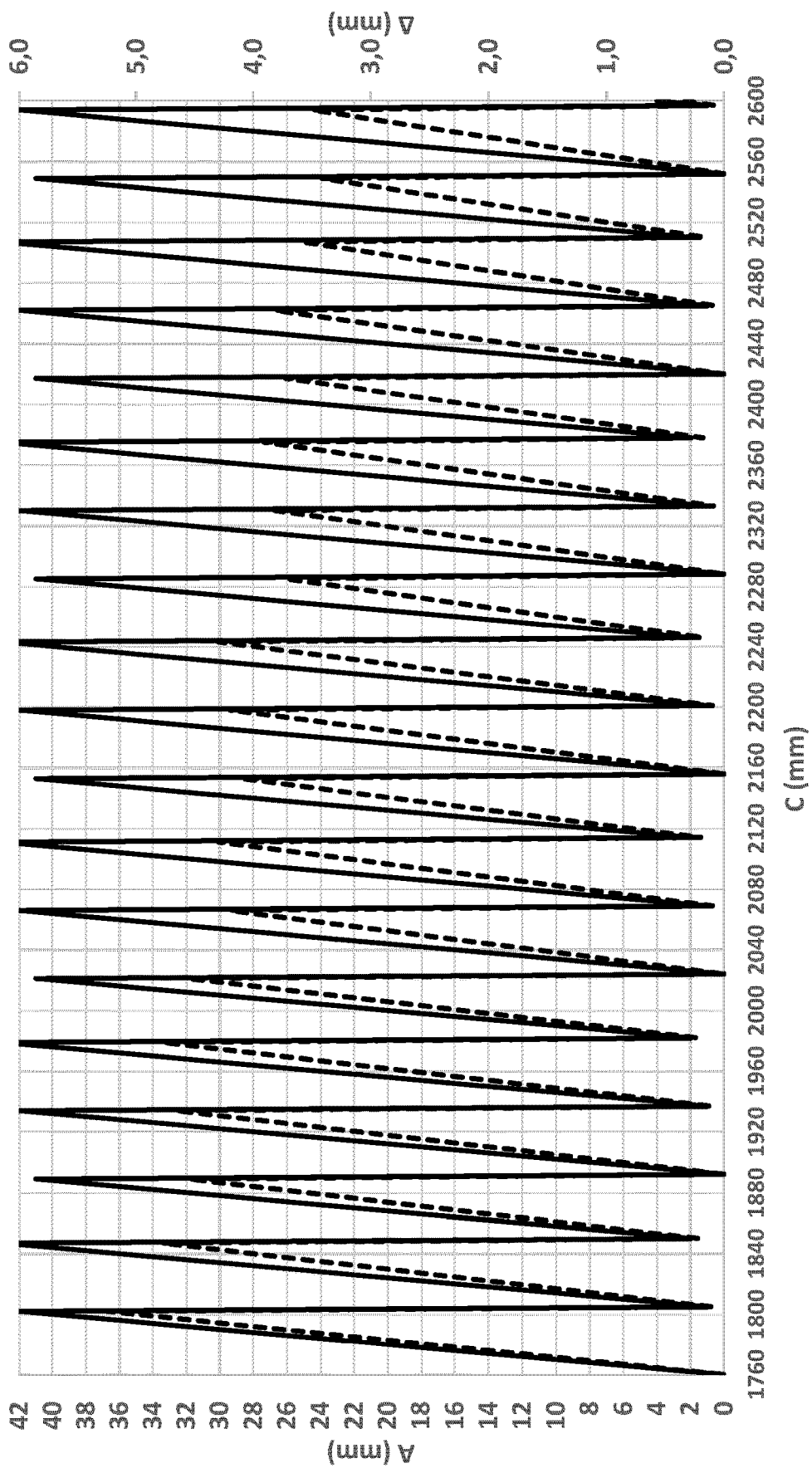
FIGS. 3a, 3b; 5; 6; 7a and 7b show graphically the numerical results for some embodiments of the present invention.
Figure 3B:
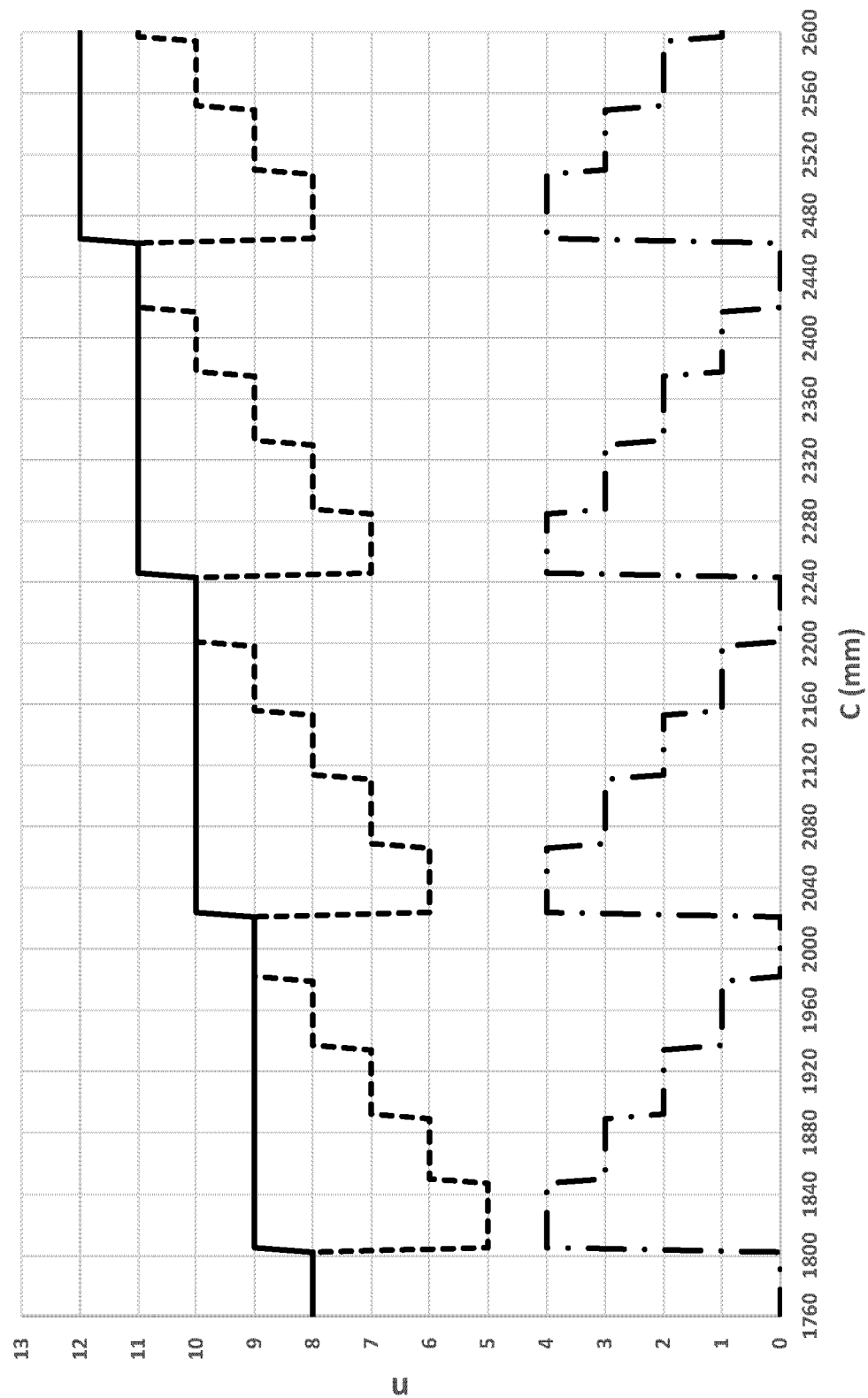

FIGS. 3a and 3b show the graphs of the numerical values calculated in this way. FIG. 3a shows, as a function of the extension C, the trend of the free arc A in mm, continuous line and left axis, and the trend of the mean interval Δ in mm, dashed line and right axis. The mean value and the standard deviation of the mean interval Δ over the whole considered range of values of the extension C are equal to 2.1 mm and 1.3 mm respectively.

FIG. 3b shows, as a function of the extension C, the corresponding total number of elements ($n_1+n_2$, solid line), the number $n_1$ of elements with dimension $L_1$, dashed line, and the number $n_2$ of elements with dimension $L_2$, dashed line.

As it can be seen, in this example the inner circumferential extension has been covered with a total number of elements that does not exceed twelve elements, as the extension C varies over a wide range and with a mean interval that always remains about between 0 and 5 mm.

It is observed that for C=1900 mm, the free arc assumes its minimum value (among all the possible pairs of numbers $n_1$ and $n_2$), equal to 8 mm, in correspondence with two pairs of numbers: $n_1$=7 and $n_2$=2 (mean interval=8/9=0.9 mm); $n_1$=3 and $n_2$=7 (mean interval=0.8 mm). In this case it may be advantageous to select the first pair consisting of one element less than the second pair (nine against ten elements).

Similarly, for C=2400 mm, the free arc assumes its minimum value, equal to 24 mm, in correspondence with three pairs of numbers: $n_1$=10 and $n_2$=1; $n_1$=6 and $n_2$=6; $n_1$=2 and $n_2$=11. In this case it may be advantageous to select the first pair consisting of only eleven elements.

It is also noted that for some values of C (for example C=2000 mm) the optimal solution provides elements having a single length $L_1$ or $L_2$ (that is, belonging to a single set).

Comparative Examples

Figure 4A:
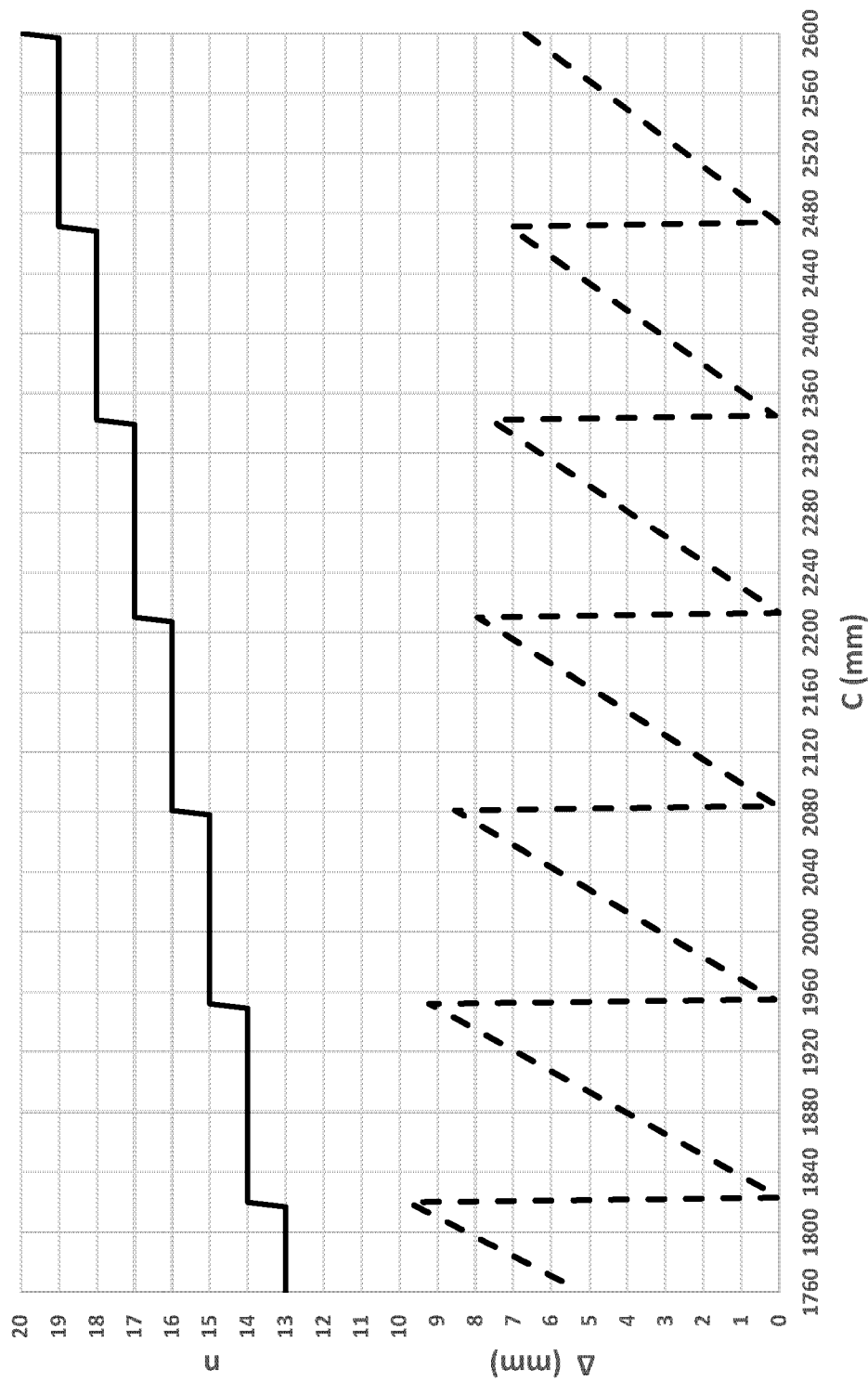
FIGS. 4a, 4b, 8a and 8b show graphically the numerical results of some comparative examples.
Figure 4B:
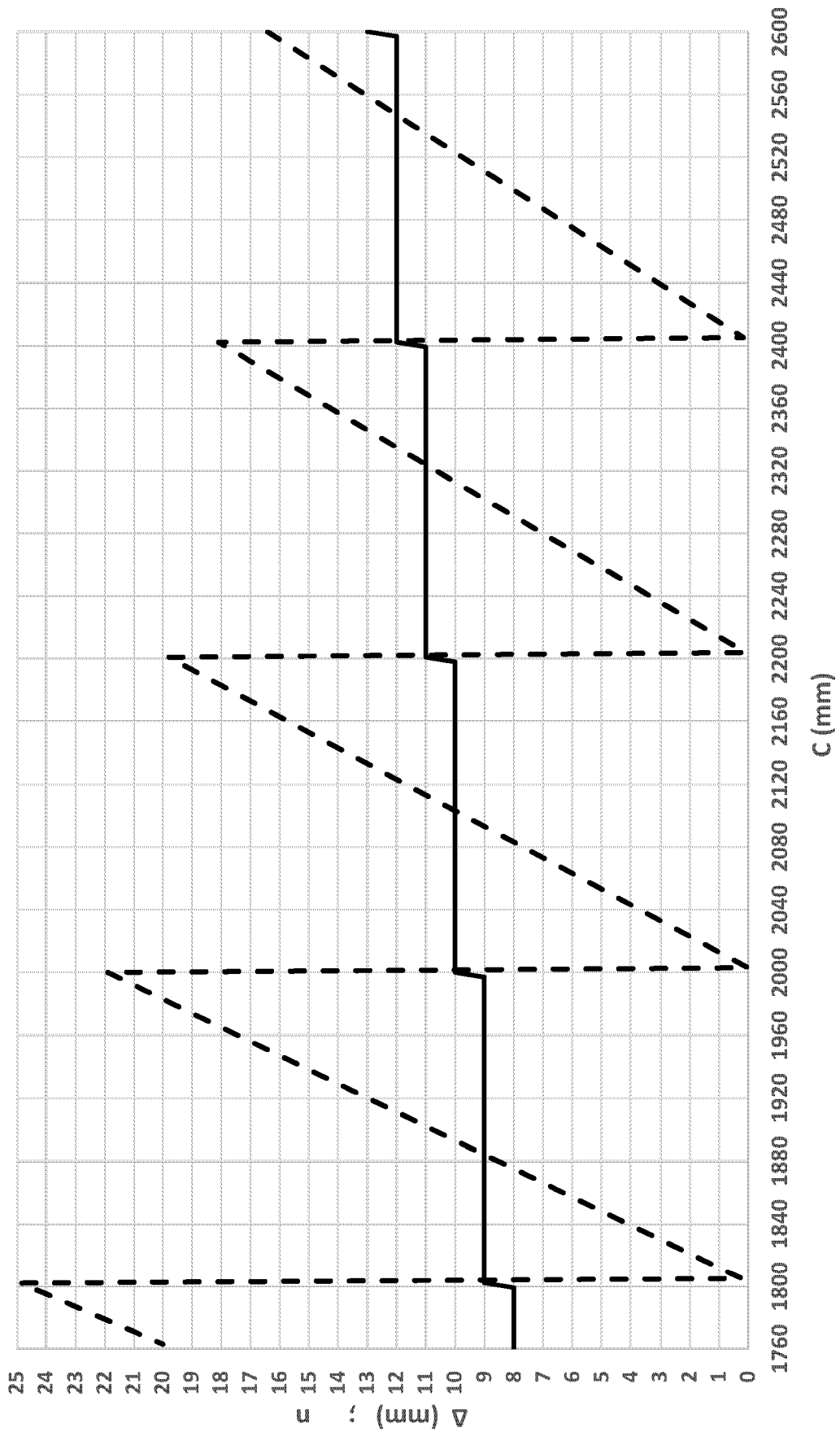

FIGS. 4a and 4b show the results calculated for two comparative examples, respectively, in which it is used only one set of elements (N=1) having dimension L=130 mm and L=200 mm respectively, searching for the minimum value of the free arc. In particular, each of the FIGS. 4a and 4b shows, on the same vertical axis on the left, as a function of the extension C (variable in the same range of values of the previous example), the trend of the mean interval Δ in mm (dashed line) and trend of the number of elements n (continuous line).

In the example of FIG. 4a, the mean value and the standard deviation of the mean interval Δ, over the range of values of the extension C, are respectively equal to 4.2 mm and 2.5 mm.

In the example of FIG. 4b, the mean value and the standard deviation of the mean interval Δ, over the range of values of the extension C, are respectively equal to 4.2 mm and 2.5 mm.

As can be seen, in the example of FIG. 4a the number of elements is considerably greater than the present invention (for example with respect to the example of FIG. 3b), in addition to a mean interval Δ which in any case assumes higher peak values and/or has a larger excursion.

In the example of FIG. 4b, against a number of elements comparable with that of the present invention (for example with respect to the example of FIG. 3b), the mean interval Δ however assumes much higher peak values and has an excursion greater than that of the example of FIG. 3b.

Therefore, the use of only one type of elements does not allow, among other things, an effective control of the mean interval and/or a limitation of the total number of elements composing the sequence.

Second Embodiment

N=3
$L_1$=220 mm
$L_2$=199 mm
$L_3$=174 mm

Figure 5:
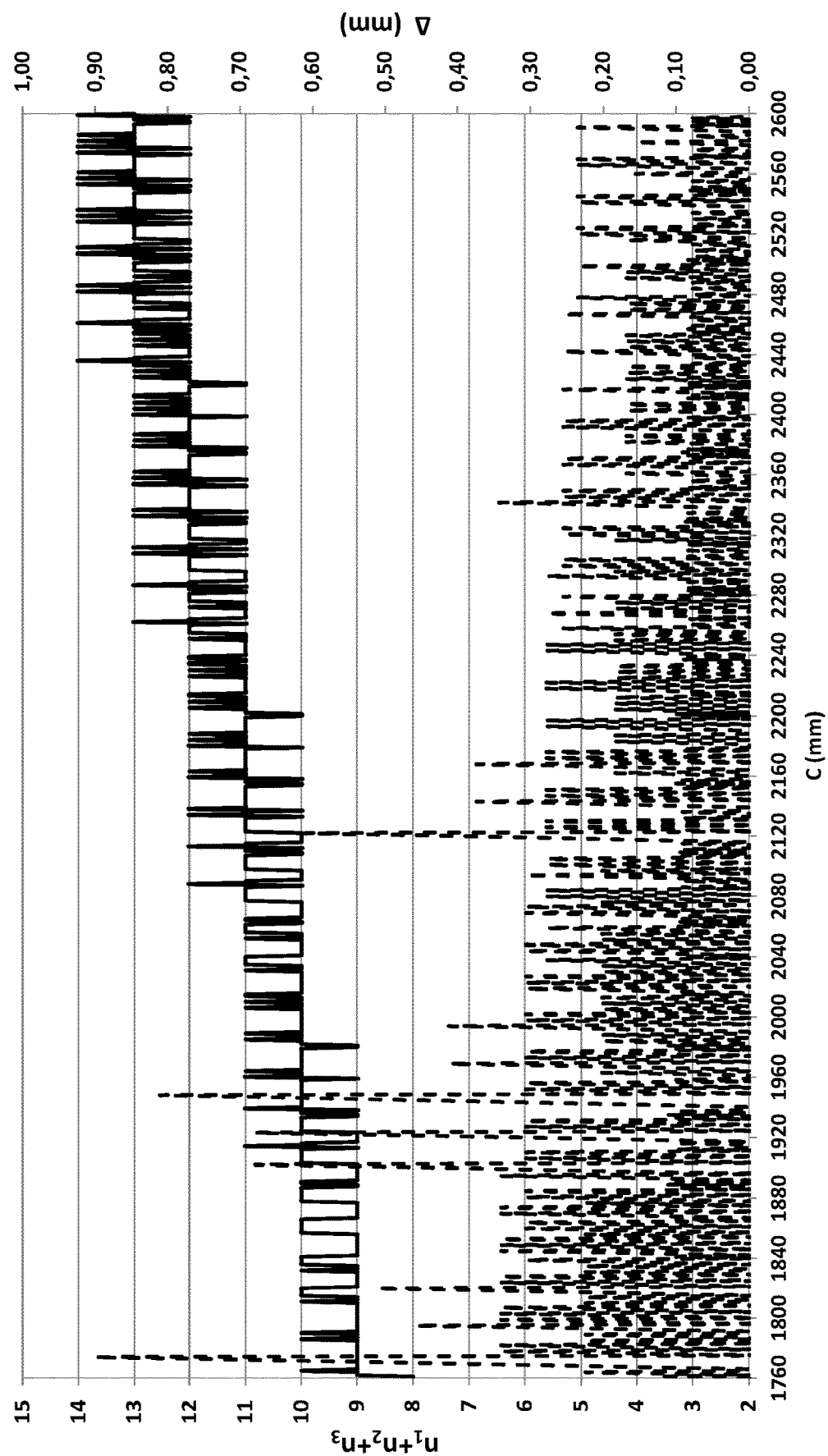

The minimum of the free arc A is identified as in the aforesaid first embodiment. FIG. 5 shows, as a function of the extension C, the total number of elements ($n_1+n_2+n_3$), solid line and left axis, and the mean interval Δ in mm, dashed line and right axis. The mean value and the standard deviation of the mean interval over the range of values of the extension C are 0.11 mm and 0.13 mm, respectively.

For example, for C=1900 mm, the free arc assumes its minimum value, equal to 4.0 mm, in correspondence with the optimal triad of numbers: $n_1$=5, $n_2$=4 and $n_3$=0 for a total of nine elements (mean interval=4/9=0.44 mm); while for C=2400 mm, the free arc assumes its minimum value, equal to 0.0 mm, in correspondence with the optimal triad of numbers: $n_1$=3, $n_2$=0 and $n_3$=10 for a total of thirteen elements (mean interval=0.0 mm).

Third Embodiment

N=4
$L_1$=220 mm
$L_2$=203 mm
$L_3$=188 mm
$L_4$=175 mm

Figure 6:
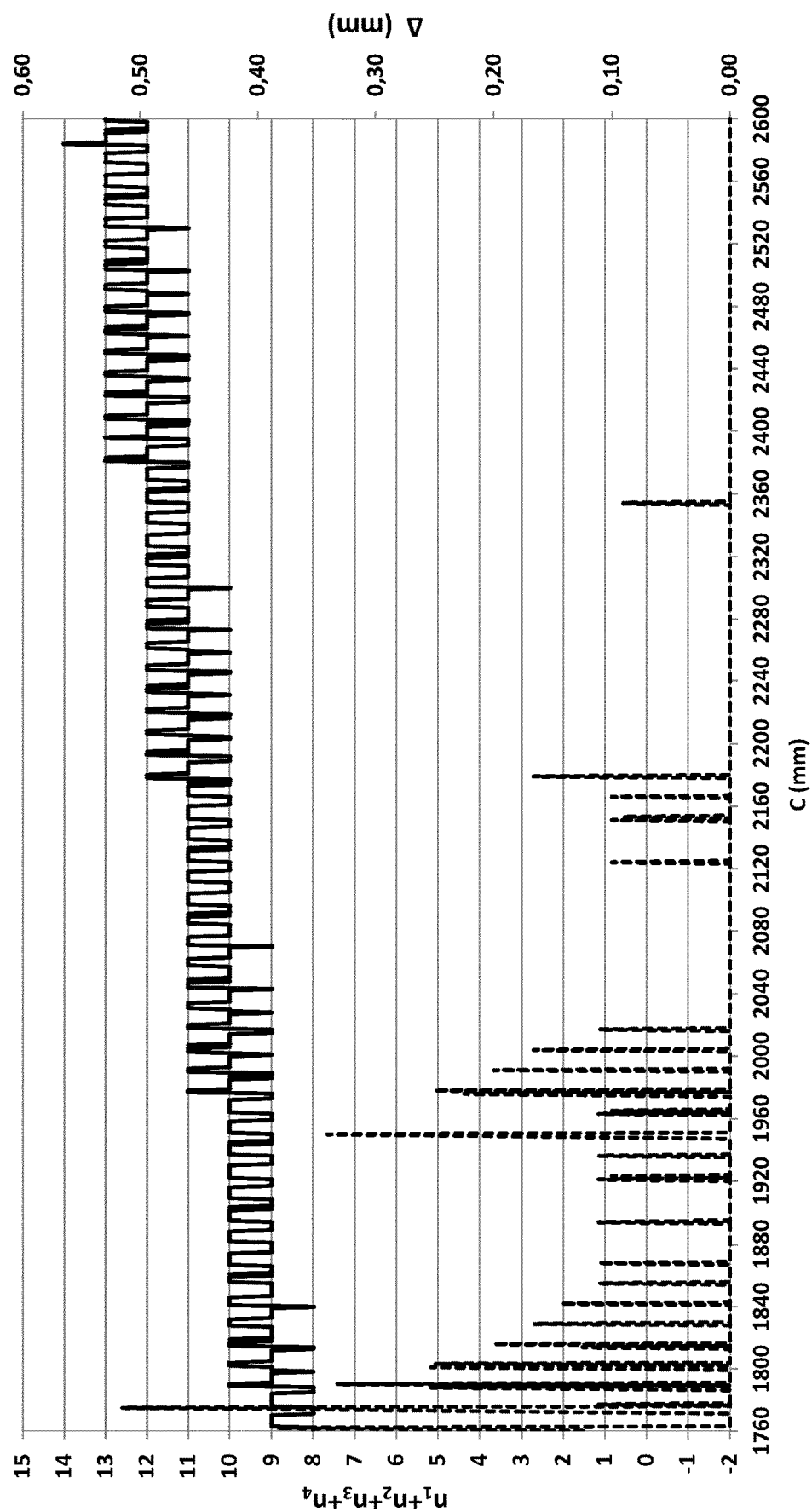

The minimum of the free arc is identified similarly to the aforesaid first embodiment. FIG. 6 shows, as a function of the extension C, the trend of the total number of elements ($n_1+n_2+n_3+n_4$), solid line and left axis, and the trend of the mean interval Δ in mm, dashed line and right axis. The mean value and the standard deviation of the mean interval, over the range of values of the extension C, are 0.01 mm and 0.04 mm, respectively.

For example, for C=1900 mm, the free arc assumes its minimum value, equal to 0.0 mm, in correspondence with the optimal quadruplet of numbers: $n_1$=1, $n_2$=2, $n_3$=3 and $n_4$=4 for a total of ten elements (mean interval=0.0 mm) while for C=2400 mm, the free arc assumes its minimum value, equal to 0.0 mm, in correspondence with the optimal quadruplet of numbers: $n_1$=4, $n_2$=1, $n_3$=4 and $n_4$=3 for a total of twelve elements (mean interval=0.0 mm).

As it can be seen, as the number N of sets of noise-reducing elements increases, the excursion of the mean interval drastically decreases (in other words, a greater control of the mean interval and/or of the free arc is possible), against a greater complexity in the management of a greater number N of sets of elements.

Fourth Embodiment

N=2
$L_1$=220 mm
$L_2$=176 mm

In this example, a minimum and a maximum threshold value of the mean interval are set, for example, equal to 3 mm and 8 mm, respectively.

Figure 7A:
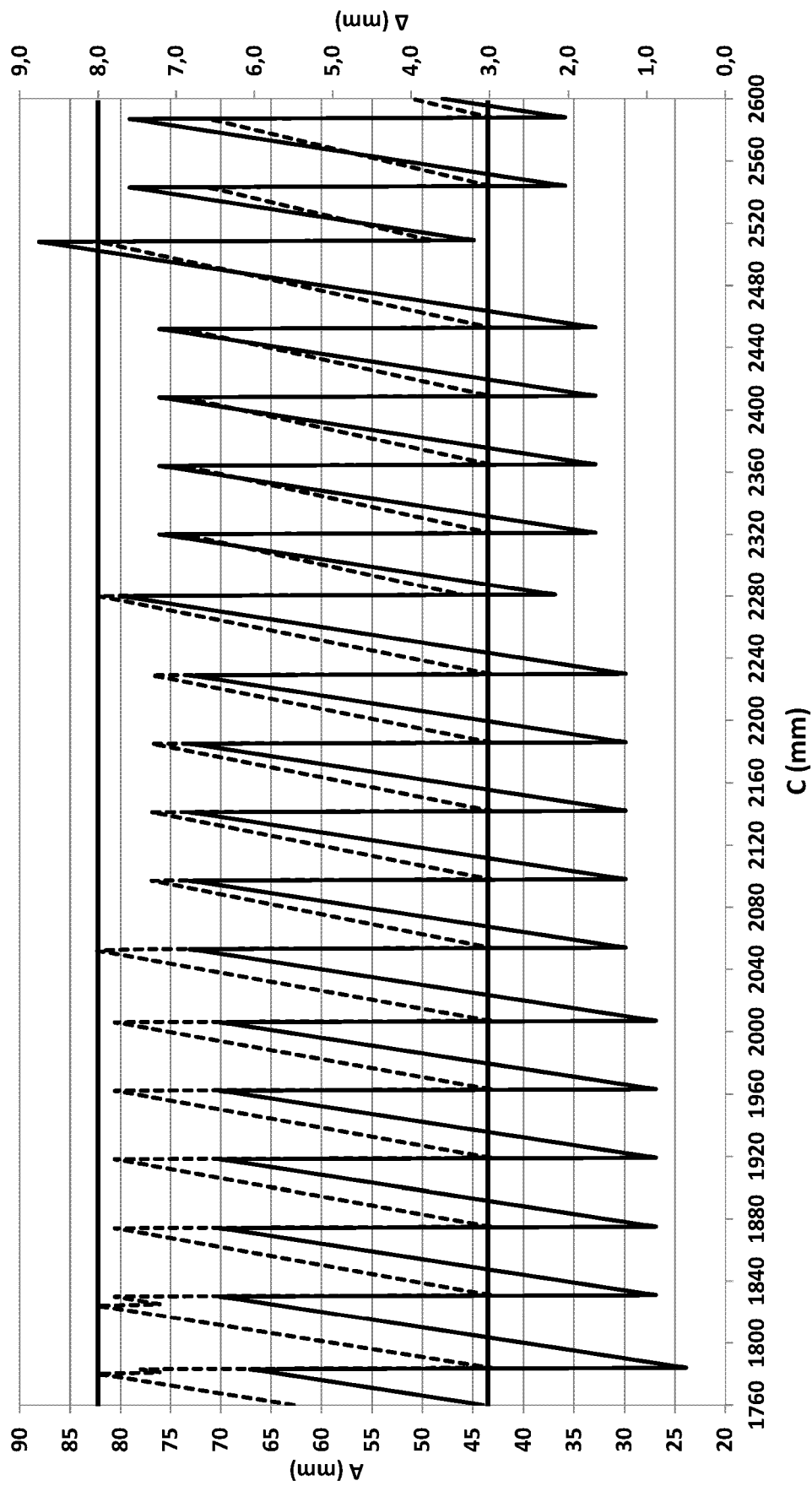
Figure 7B:
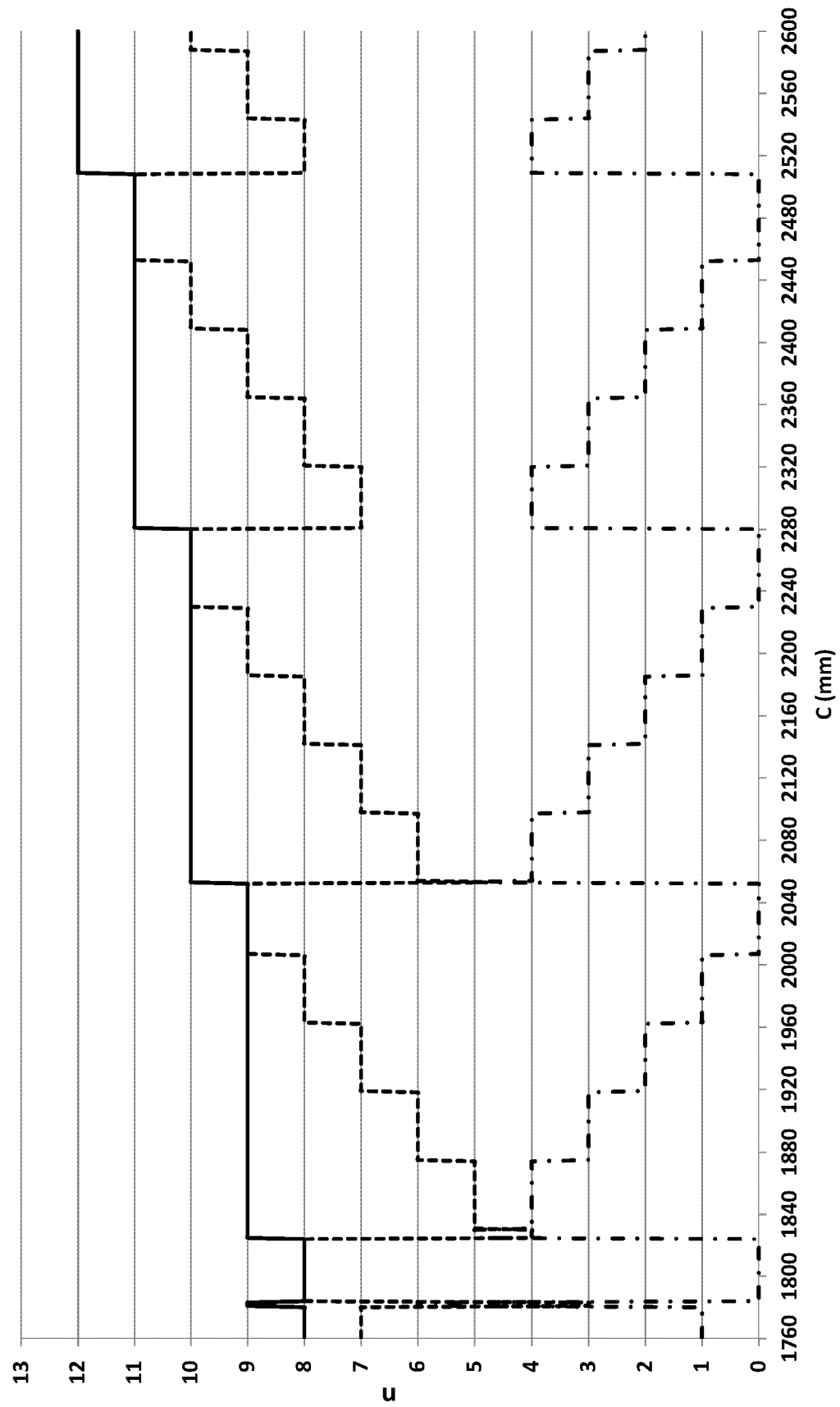

For each value of the inner circumferential extension C in the aforesaid interval, for all the pairs of numbers $n_1$ and $n_2$, for example with $n_1$ and $n_2$ each one going from zero to fifteen, the respective mean interval Δ is calculated by means of the aforesaid formula $$\sum_{x=1}^{N} n_x * L_x + \Delta * \sum_{x=1}^{N} n_x = C$$

and there are identified all the pairs for which the mean interval Δ satisfies the predetermined minimum and maximum values. Among all the pairs of numbers thus identified for each value C, it is (possibly) selected the pair of numbers $n_1$ and $n_2$ having the minimum of the sum $n_1+n_2$ of the two numbers. FIGS. 7a and 7b show two graphs of the numerical values thus calculated. FIG. 7a shows, as a function of the extension C, the trend of the free arc A in mm, solid line and left axis, and the trend of the mean interval Δ in mm, dashed line and right axis. In the figure there are also shown the predetermined lower and upper limits of the mean interval Δ. FIG. 7b shows, as a function of the extension C, the total number of elements ($n_1+n_2$, solid line), the number $n_1$ of elements with dimension $L_1$, dashed line, and the number $n_2$ of elements with dimension $L_2$, point-like dashed line.

It is observed that the present solution guarantees, among other things, a remarkable uniformity of characteristics for the whole range of values C considered, in terms of mean interval, against a limited total number of elements (in the example from eight to twelve elements), comparable with the solution of FIGS. 3a and 3b.

Comparative Example

Figure 8A:
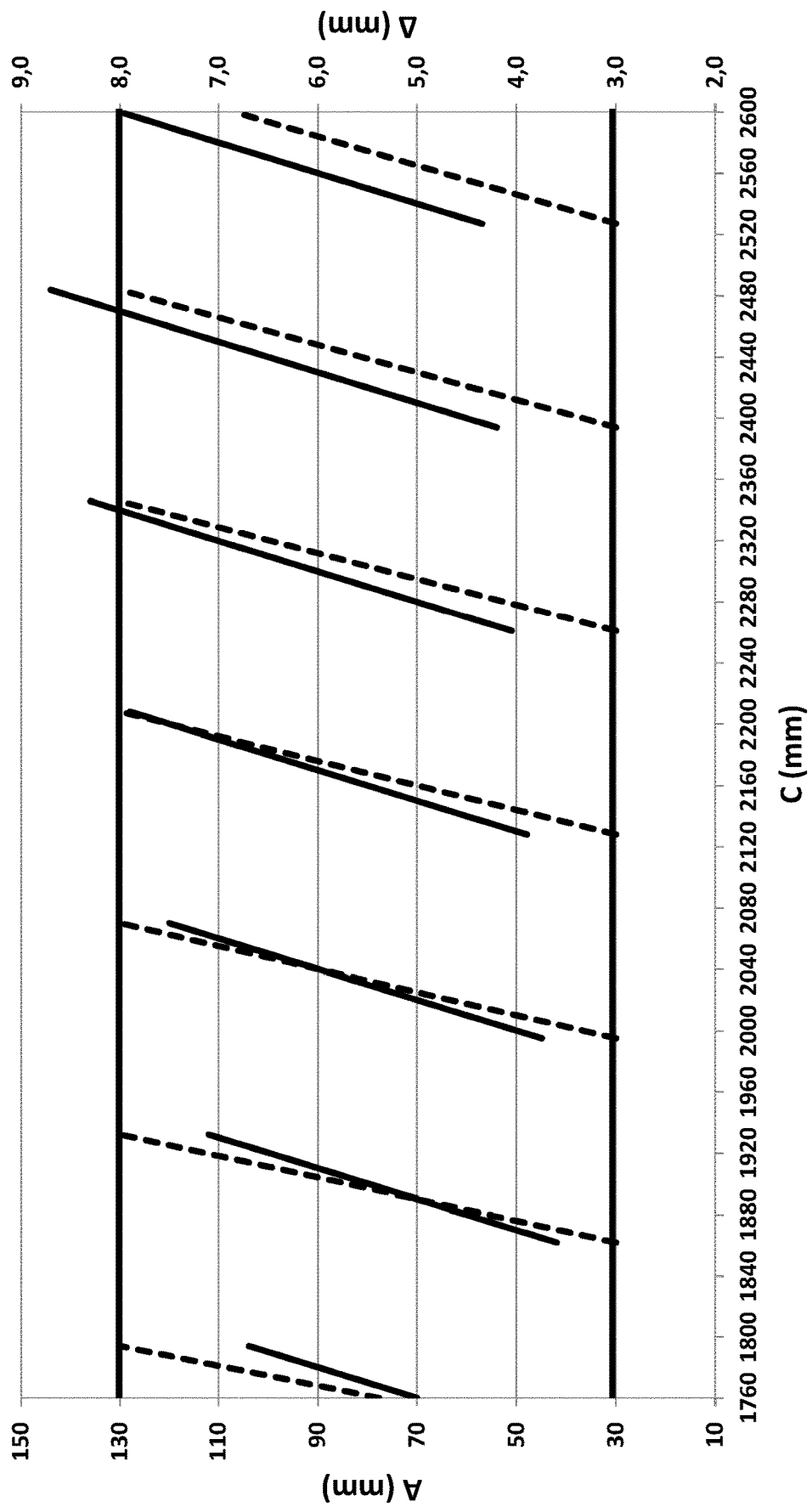
Figure 8B:
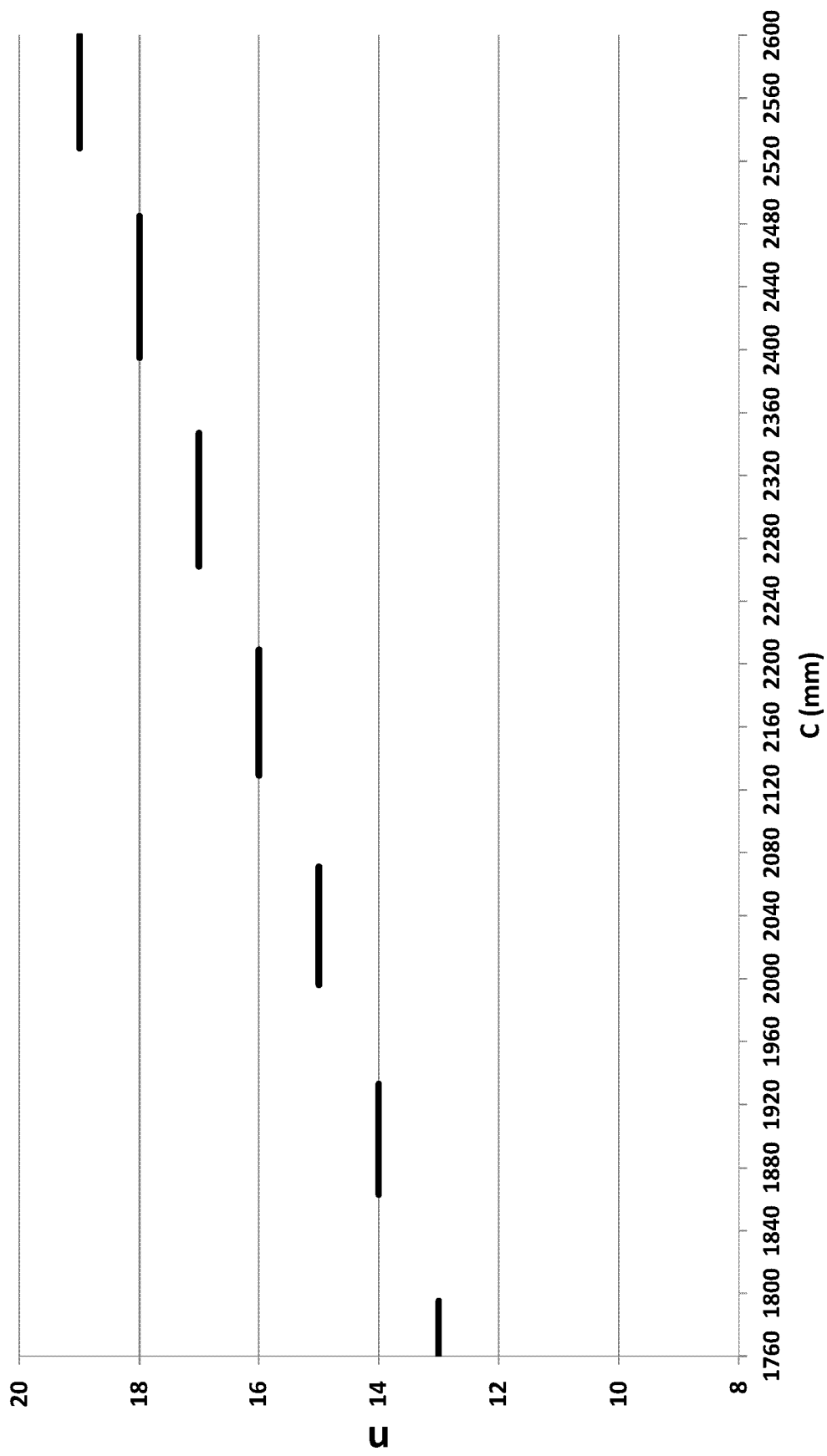

FIGS. 8a and 8b show the results calculated for a comparative example in which it is used only one set of elements (N=1) having dimension L=130 mm, looking for, as a function of the inner circumferential extension C in the aforesaid interval, the solutions for which the mean interval Δ satisfies the minimum and the maximum values predetermined to 3 mm and 8 mm, respectively. In particular, FIG. 8a shows, as a function of the extension C in mm, the trend of the free arc A in mm, broken solid line and left axis, and the trend of the mean interval Δ in mm, broken dashed line and right axis. In the figure there are also shown the predetermined lower and upper limits of the mean interval Δ. FIG. 8b shows the number n of elements as a function of the extension C. In FIGS. 8a and 8b all the lines of the trends are interrupted at the regions of values of the extension C in which there are no solutions that satisfy the conditions imposed on the mean interval Δ. In other words, in these regions it is not possible to make a sequence, with the available noise-reducing elements, that leaves a mean interval Δ between 3 and 8 mm.

Therefore, in the comparative example of FIGS. 8a and 8b, not only the number of elements (which varies between thirteen and nineteen elements) and the variation of the free arc (up to 144 mm) are considerably greater than the respective ones of the present invention (for example with respect to the example of FIGS. 7a and 7b), but also, for some values of the extension C, it is not possible to find the desired solution.

The invention claimed is:

1. A process for producing tyres, comprising:
arranging a plurality N of sets of noise-reducing elements, wherein all the noise-reducing elements belonging to each set have a respective substantially equal dimension $L_x$, with x ranging from 1 to N, the respective dimension $L_x$ of the noise-reducing elements of each set differs from the respective dimension $L_x$ of the noise-reducing elements of the other N−1 sets, and the plurality N of sets comprises no more than four sets;
feeding in succession a set of tyres for wheels of vehicles, wherein each tyre has a respective inner circumferential extension, and the set of tyres has different values of the inner circumferential extension;
for each one of the inner circumferential extension values, determining a respective number $n_x$ of noise-reducing elements for each set of noise-reducing elements, with x ranging from 1 to N, as a function of the value of the inner circumferential extension, wherein for at least one value of the inner circumferential extension of the set of tyres, at least two respective numbers $n_x$ differ from 0; and
for each tyre of the set of tyres, collecting from each set of noise-reducing elements the respective number $n_x$ of noise-reducing elements determined for the value of the inner circumferential extension of each tyre and applying the collected noise-reducing elements in a circumferential sequence along an inner surface of each tyre, with the respective dimension $L_x$ oriented circumferentially.

2. The process according to claim 1, wherein the plurality N of sets of noise-reducing elements comprises no more than three sets.

3. The process according to claim 1, wherein the plurality N of sets of noise-reducing elements consists of two sets.

4. The process according to claim 1, wherein the respective numbers $n_x$ determined for each value of the inner circumferential extension of the set of tyres are determined further as a function of a free arc, wherein the free arc is a circumferential length of an overall portion of the inner circumferential extension left free of the noise-reducing elements of the circumferential sequence applied.

5. The process according to claim 1, wherein the respective numbers $n_x$ determined for each value of the inner circumferential extension of the set of tyres are determined further as a function of a mean interval between the noise-reducing elements, wherein the mean interval is a mean distance between the noise-reducing elements of the circumferential sequence applied.

6. The process according to claim 1, wherein the respective numbers $n_x$ are determined, for each value of the inner circumferential extension of the set of tyres, using the formula:

$$\sum_{x=1}^{N} n_x * L_x + \Delta * \sum_{x=1}^{N} n_x = C$$

wherein C is the value of the inner circumferential extension and Δ is a mean distance between the noise-reducing elements.

7. The process according to claim 1, further comprising:
for a plurality of n-tuples of numbers $n_x$, with each $n_x$ ranging from zero to a given maximum value, calculating a respective free arc, wherein the free arc is a circumferential length of an overall portion of the inner circumferential extension left free of the noise-reducing elements of the circumferential sequence applied; and
selecting from among all the n-tuples of numbers $n_x$ considered, at least one n-tuple of numbers $n_x$ as a function of the calculated free arcs.

8. The process according to claim 7, wherein the respective numbers $n_x$ are determined by selecting, among all the n-tuples of numbers $n_x$, with $n_x$ ranging from 0 to the given maximum value, an n-tuple of numbers to which a minimum of the calculated free arc corresponds.

9. The process according to claim 8, further comprising selecting, among all the n-tuples of numbers $n_x$ to which a minimum of the calculated free arc corresponds, an n-tuple of numbers having the minimum sum of the numbers $n_x$.

10. The process according to claim 1, further comprising:
for a plurality of n-tuples of numbers $n_x$, with each $n_x$ ranging from zero to a given maximum value, calculating a respective mean interval, wherein the mean interval is a mean distance between the noise-reducing elements of the circumferential sequence applied; and selecting from among all the n-tuples of numbers $n_x$ considered, at least one n-tuple of numbers $n_x$ as a function of the calculated mean intervals.

11. The process according to claim 10, wherein the respective numbers $n_x$ are determined by selecting, among all the n-tuples of numbers $n_x$, with each $n_x$ ranging from zero to the given maximum value, an n-tuple of numbers for which at least one of: the mean interval is less than or equal to a given maximum threshold value, and the mean interval is greater than or equal to a given minimum threshold value differing from zero.

12. The process according to claim 11, wherein the given maximum threshold value of the mean interval is 20 mm and the given minimum threshold value of the mean interval is 3 mm.

13. The process according to claim 11, further comprising selecting, among all the n-tuples of numbers for which at least one of: the mean interval is less than or equal to the given maximum threshold value and the mean interval is greater than or equal to the given minimum threshold value, an n-tuple of numbers having the minimum sum of the numbers $n_x$.

14. The process according to claim 1, wherein the respective dimension $L_x$ of all the noise-reducing elements is greater than or equal to 100 mm and wherein, sorting the sets of noise-reducing elements in ascending order of the respective dimension $L_x$, a difference between the respective dimension $L_x$ of the noise-reducing elements of each set and the respective dimension $L_x$ of the noise-reducing elements of at least one of a respective preceding and subsequent set is greater than or equal to 10 mm.

15. A set of tyres for wheels of vehicles,
wherein each tyre has a respective value of the inner circumferential extension and at least some tyres of the set of tyres have different values of the inner circumferential extension,
wherein a respective sequence of noise-reducing elements is applied circumferentially along an inner surface of each tyre of the set of tyres,
wherein the noise-reducing elements applied to the set of tyres belong to a plurality N of sets of noise-reducing elements,
wherein all the noise-reducing elements belonging to each set of noise-reducing elements have a respective substantially equal circumferential dimension $L_x$, with x ranging from 1 to N,
wherein the respective circumferential dimension $L_x$ of the noise-reducing elements of each set of noise-reducing elements differs from the respective circumferential dimension $L_x$ of the noise-reducing elements of the other N−1 sets of noise-reducing elements, and the plurality N of sets comprises no more than four sets,
wherein for each set of noise-reducing elements, the respective sequence of noise-reducing elements comprises a respective number $n_x$ of noise-reducing elements, with x ranging from 1 to N, the n-tuple of the respective numbers $n_x$ being a function of the respective value of the inner circumferential extension, and
wherein for at least one sequence of noise-reducing elements, at least two respective numbers $n_x$ differ from zero.

16. The set according to claim 15, wherein the plurality N of sets of noise-reducing elements comprises no more than three sets.

17. The set according to claim 15, wherein the plurality of N sets of noise-reducing elements consists of two sets.

18. The set according to claim 15, wherein a mean interval is a mean distance between the noise-reducing elements of the sequence circumferentially applied, the mean interval being less than or equal to a given maximum threshold value equal to 20 mm.

19. The set according to claim 15, wherein a mean interval is a mean distance between the noise-reducing elements of the sequence circumferentially applied, the mean interval being greater than or equal to a given minimum threshold value differing from zero.

20. The set according to claim 15, wherein the respective dimension $L_x$ of all the noise-reducing elements is greater than or equal to 100 mm.

21. The set according to claim 20, wherein the respective dimension $L_x$ of all the noise-reducing elements is less than or equal to 300 mm.

22. The set according to claim 15, wherein, sorting the sets of noise-reducing elements in ascending order of the respective dimension $L_x$, a difference between the respective dimension $L_x$ of the noise-reducing elements of each set and the respective dimension $L_x$ of the noise-reducing elements of at least one of a respective preceding and subsequent set is greater than or equal to 10 mm.

23. The set according to claim 22, wherein, sorting the sets of noise-reducing elements in ascending order of the respective dimension $L_x$, a difference between the respective dimension $L_x$ of the noise-reducing elements of each set and the respective dimension $L_x$ of the noise-reducing elements of at least one of a respective preceding and subsequent set is less than or equal to 80 mm.

* * * * *